United States Patent
Chan et al.

(10) Patent No.: US 11,683,169 B2
(45) Date of Patent: *Jun. 20, 2023

(54) MASKED KEY HOPPING

(71) Applicant: EBAY INC., San Jose, CA (US)

(72) Inventors: Michael J. T. Chan, Cupertino, CA (US); Derek Chamorro, Austin, TX (US); Venkata Siva Vijayendra Bhamidipati, Milpitas, CA (US); Glenn G. Lebumfacil, Dublin, CA (US); Ralph Scott Forsythe, Denver, CO (US)

(73) Assignee: EBAY INC., San Jose, CA (US)

(*) Notice: Subject to any disclaimer, the term of this patent is extended or adjusted under 35 U.S.C. 154(b) by 69 days.

This patent is subject to a terminal disclaimer.

(21) Appl. No.: 17/340,798

(22) Filed: Jun. 7, 2021

(65) Prior Publication Data
US 2021/0297249 A1    Sep. 23, 2021

Related U.S. Application Data

(63) Continuation of application No. 15/901,455, filed on Feb. 21, 2018, now Pat. No. 11,070,373.

(51) Int. Cl.
*H04L 9/08* (2006.01)
*G06F 21/52* (2013.01)
(Continued)

(52) U.S. Cl.
CPC .......... *H04L 9/0894* (2013.01); *G06F 21/52* (2013.01); *G06F 21/62* (2013.01); *G06F 21/75* (2013.01);
(Continued)

(58) Field of Classification Search
CPC . H04L 9/0894; H04L 9/0891; H04L 2209/04; G06F 21/52; G06F 21/62; G06F 21/75
See application file for complete search history.

(56) References Cited

U.S. PATENT DOCUMENTS

| | | | | |
|---|---|---|---|---|
| 4,376,977 A | * | 3/1983 | Bruinshorst | ............ G06F 9/321 |
| | | | | 711/201 |
| 8,379,857 B1 | * | 2/2013 | Zheng | .................. H04L 63/062 |
| | | | | 380/255 |

(Continued)

FOREIGN PATENT DOCUMENTS

| | | |
|---|---|---|
| CN | 101449276 A | 6/2009 |
| CN | 107113292 A | 8/2017 |

(Continued)

OTHER PUBLICATIONS

Paul Parker T et al., IDS dated Aug. 12, 2021; "A Method for Safekeeping Cryptographic Keys from Memory Disclosure Attacks", Dec. 17, 2009 (Dec. 17, 2009), Trusted Systems, Springer Berlin Heidelberg, Berlin, Heidelberg, pp. 39-59. (Year: 2009).*

(Continued)

*Primary Examiner* — Linglan Edwards
*Assistant Examiner* — Hamid Talaminaei
(74) *Attorney, Agent, or Firm* — Shook, Hardy & Bacon LLP

(57) ABSTRACT

Systems and methods for managing keys in a computer memory are described. In some embodiments, location addresses are determined for two key elements. A periodic time interval that is based on a time duration for performing a transaction involving a distance between the key elements is determined. One key element may be stored at a location address and then relocated to another location address after the periodic time interval has passed. In some embodiments, areas the computer memory may remain static during relocation of the key element.

20 Claims, 6 Drawing Sheets

(51) Int. Cl.
G06F 21/62 (2013.01)
G06F 21/75 (2013.01)
(52) U.S. Cl.
CPC ........ H04L 9/0891 (2013.01); *H04L 2209/04* (2013.01)

(56) References Cited

U.S. PATENT DOCUMENTS

| | | | |
|---|---|---|---|
| 8,494,154 | B2 | 7/2013 | Shah et al. |
| 9,184,910 | B2 | 11/2015 | Zhu et al. |
| 9,209,967 | B2 | 12/2015 | Yup |
| 9,705,674 | B2 | 7/2017 | Roth et al. |
| 11,070,373 | B2 | 7/2021 | Chan et al. |
| 2006/0095977 | A1 | 5/2006 | Nam et al. |
| 2012/0290851 | A1 | 11/2012 | Emam et al. |
| 2013/0013934 | A1 | 1/2013 | King et al. |
| 2015/0052616 | A1* | 2/2015 | Hutchison ............. G06F 3/0632 726/27 |
| 2016/0085955 | A1 | 3/2016 | Lerner |
| 2017/0286674 | A1* | 10/2017 | Gathala ................... G06F 21/52 |
| 2019/0081782 | A1* | 3/2019 | Dewitt .................. G06F 21/602 |
| 2019/0260584 | A1 | 8/2019 | Chan et al. |

FOREIGN PATENT DOCUMENTS

| | | |
|---|---|---|
| WO | 91/07042 A1 | 6/1991 |
| WO | 2019/164796 A1 | 8/2019 |

OTHER PUBLICATIONS

International Preliminary Report on Patentability received for PCT Application No. PCT/US2019/018474, dated Sep. 3, 2020, 9 pages.
Final Office Action Received for U.S. Appl. No. 15/901,455, dated Sep. 30, 2020, 22 pages.
Non Final Office Action Received for U.S. Appl. No. 15/901,455, dated Mar. 19, 2020, 17 pages.
Notice of Allowance Received for U.S. Appl. No. 15/901,455, dated Mar. 17, 2021, 14 Pages.
Communication under Rule 71(3) received for European Patent Application No. 19709600.1, dated Jun. 29, 2021, 46 Pages.
Edge, "Kernel address space layout randomization", Retrieved from the internet URL:<https://lwn.net/Articles/569635/>, Oct. 9, 2013, 4 pages.
Gonsalves,"Advanced attackers seen moving to sophisticated hacking technique", Address Space Layout Randomization (ASLR) scrambling memory positions of program elements in Windows, Oct. 16, 2013, 3 pages.
Gruss et al., "KASLR is Dead: Long Live KASLR", Retrieved from the internet URL:<https://gruss.cc/files/kaiser.pdf>, Engineering Secure Software and Systems 2017, Jun. 24, 2017, 16 pages.
Jang et al., "Breaking Kernel Address Space Layout Randomization with Intel TSX", 2016 ACM SIGSAC Conference on Computer and Communications Security. CCS '16. New York, NY, USA: ACM: 380, 2016, 16 pages.
Li et al., "Address-Space Randomization for Windows Systems", Retrieved from the internet URL:<http://seclab.cs.stonybrook.edu/seclab/pubs/acsac06.pdf>. Global InfoTek, Inc.,, (accessed Apr. 10, 2012), 10 pages.
Marco-Gisbert et al., "On the Effectiveness of Full-ASLR on 64-bit Linux", Retrieved from the internet URL:<https://cybersecurity.upv.es/attacks/offset2lib/offset2lib-paper.pdf>, Universitat Politècnica de València, Nov. 20, 2014, 9 Pages.
Parker et al., "A Method for Safekeeping Cryptographic Keys from Memory Disclosure Attacks", Trusted Systems, Springer, Dec. 17, 2009, pp. 39-59.
International Search Report received for PCT Application No. PCT/US2019/018474, dated Jun. 4, 2019, 4 pages.
Written Opinion received for PCT Application No. PCT/US2019/018474, dated Jun. 4, 2019, 7 pages.
Rocha et al., "Lucy in the sky without diamonds: Stealing confidential data in the cloud", Dependable Systems and Networks Workshops (DSN-W), 2011 IEEE/IFIP 41st International Conference on, IEEE, Jun. 27, 2011, pp. 129-134.
Snyder, "We Need to Talk About Dwell Time", Retrieved from the Internet: <https://www.extrahop.com/company/blog/2017/dwell-time-new-security-metric/>, Dec. 18, 2017, 3 pages.
Whitehouse, "An Analysis of Address Space Layout Randomization on Windows Vista", Symantec Advanced Threat Research, Feb. 2007, 19 Pages.
Office Action Received for Chinese Patent Application No. 201980010367.2, dated Feb. 7, 2023, 6 pages (1 page of english translation & 5 pages of official copy).

\* cited by examiner

MASKED KEY HOPPING

CROSS-REFERENCE TO RELATED APPLICATIONS

This application is a continuation of and claims the benefit of priority to U.S. patent application Ser. No. 15/901,455, filed Feb. 21, 2018, the benefit of priority of which is claimed hereby, and which is incorporated by reference herein in its entirety.

TECHNICAL FIELD

Embodiments of the present disclosure relate generally to data encryption and, more particularly, but not by way of limitation, to systems and methods for masked key hopping in computers, cloud-based agents, and domains. In other aspects, the disclosure relates to encryption key protection without high security modules in cloud environments.

BACKGROUND

Cloud computing generally refers to a computing environment with dynamically scalable and often virtualized resources, which are typically provided as services over the Internet. For example, cloud computing environments often employ the concept of virtualization as a convenient paradigm for hosting workloads on any appropriate hardware. The cloud computing model has become increasingly viable for many enterprises for various reasons, including that the cloud infrastructure may permit information technology resources to be treated as utilities that can be automatically provisioned on demand, while also limiting the cost of services to actual resource consumption. Moreover, consumers of resources provided in cloud computing environments can leverage technologies that might otherwise be unavailable. Thus, as cloud computing and cloud storage become more pervasive, many enterprises will find that moving data centers to cloud providers can yield economies of scale. But improving speed and scalability while reducing costs can present significant technical and security challenges in cloud environments.

For security reasons, high security modules ("HSMs") may be deployed in cloud applications, such as for storing and handling private keys. But HSMs are expensive and may not be ubiquitously available. These challenges are particularly difficult in public cloud environments where allocated memory is elastic and can be reallocated. Unskilled or inexperienced computer users in such cloud environments may not be aware that it can be extremely dangerous to store secret data, for example encryption keys or other credentials in memory, especially in plain text, for example. The risk is exacerbated if the keys are stored statically, or left in reallocated memory.

In these cloud-based situations, or other computing situations, advance persistent threats ("APTs") can arise. Malicious hacking attempts, such as "injection" attacks, "stack" or "buffer" overflows, or a "heart-bleed" type of attack, can cause computer memory to be "dumped out" and keys or credentials stored therein can be found. Attackers can also induce memory data to change within a short time, and any static data identified therein can be identified as a likely source of keys or other credentials that can be cracked open or attacked. Such automated attacks can include key search capability which can identify and steal keys from dumped memory within a very short time.

The present inventors seek to address these and other technical problems, and seek to provide encryption and computer security systems, methods and media as technical solutions thereto as described more fully below.

BRIEF DESCRIPTION OF THE DRAWINGS

Some embodiments of the present disclosure are illustrated by way of example and not limitation in the figures of the accompanying drawings, in which like reference numbers indicate similar elements.

DETAILED DESCRIPTION

Figure 1:
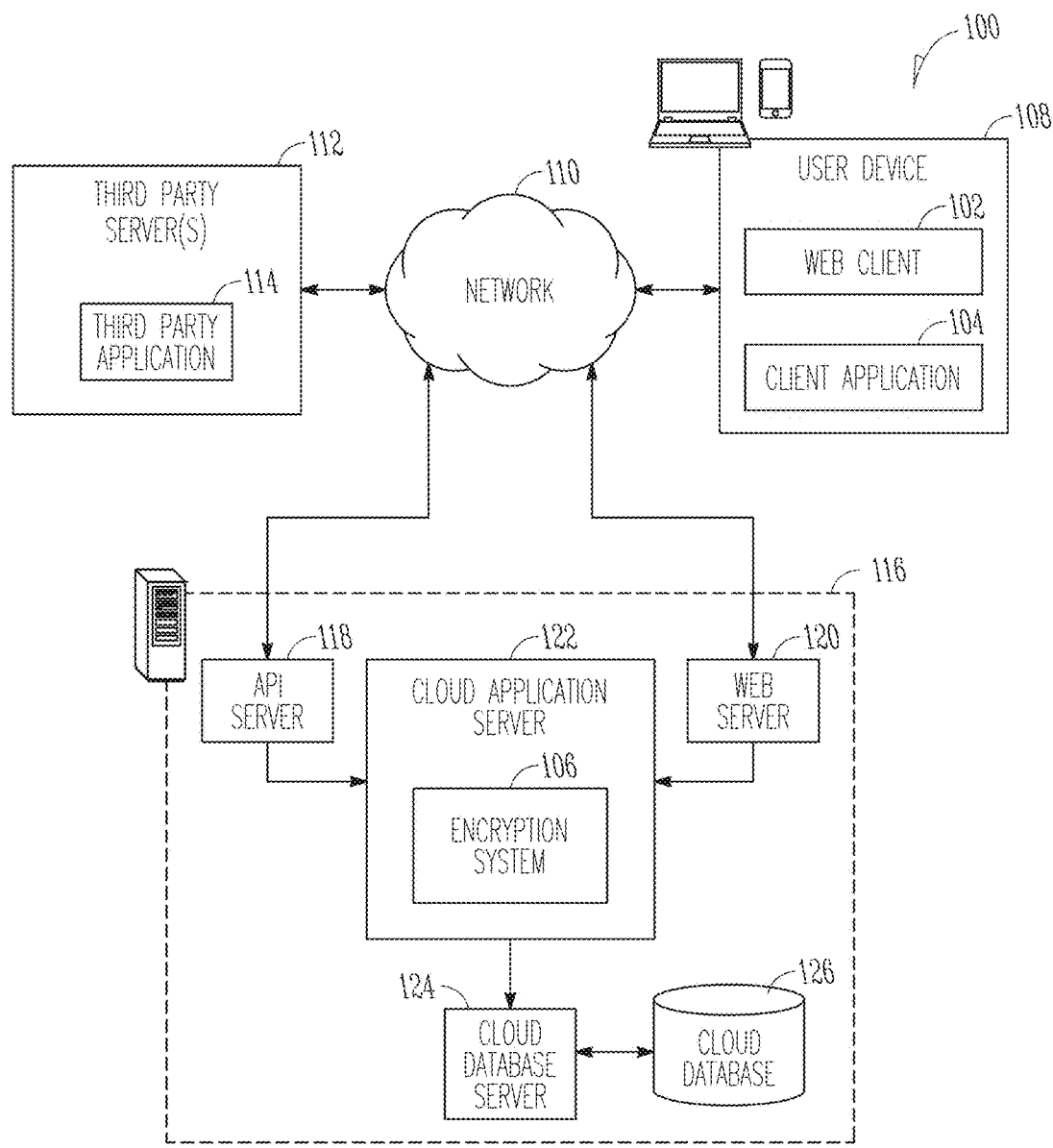
FIG. 1 is a block diagram illustrating a networked system, according to an example embodiment.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter can be practiced without these specific details. In general, well-known instruction instances, protocols, structures, and techniques have not been shown in detail. The present disclosure provides technical solutions for optimizing and improving encryption and security in a cloud or other computing environment. Systems, methods, and architectures for deployment optimization are disclosed herein.

"CARRIER SIGNAL", in this context, refers to any intangible medium that is capable of storing, encoding, or carrying instructions for execution by a machine, and includes digital or analog communications signals or other intangible media to facilitate communication of such instructions. Instructions may be transmitted or received over a network using a transmission medium via a network interface device and using any one of a number of well-known transfer protocols.

"CLIENT DEVICE", in this context, refers to any machine that interfaces with a communications network to obtain resources from one or more server systems or other client devices. A client device may be, but is not limited to, a mobile phone, desktop computer, laptop, portable digital assistant (PDA), smart phone, tablet, ultra-book, netbook, laptop, multi-processor system, microprocessor-based or programmable consumer electronics system, game console, set-top box, or any other communication device that a user may use to access a network.

"COMMUNICATIONS NETWORK", in this context, refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling of the client device to the network may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"COMPONENT", in this context, refers to a device, a physical entity, or logic having boundaries defined by function, method, property, object or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"MACHINE-READABLE MEDIUM", in this context, refers to a component, a device, or other tangible media able to store instructions and data temporarily or permanently, and may include, but not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"PROCESSOR", in this context, refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor may further be a multi-core processor having two or more independent processors (sometimes referred to as "cores") that may execute instructions contemporaneously.

A portion of the disclosure of this patent document contains material that is subject to copyright protection. The copyright owner has no objection to the facsimile reproduction by any one of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2018, eBay Inc., All Rights Reserved.

With reference to FIG. 1, an example embodiment of a high-level SaaS network architecture 100 is shown. A networked system 116 provides server-side functionality via a network 110 (e.g., the Internet or a WAN) to a client device 108. A web client 102 and a programmatic client, in the example form of an application (or agent or domain) 104, are hosted and execute on the client device 108. The networked system 116 includes a cloud domain application server 122, which in turn hosts an encryption system 106 (also termed a computer security system herein) that provides a number of functions and services to the application 104 that accesses the networked system 116. The application 104 also provides a number of interactive user interfaces described herein, which present output of tracking and analysis operations to a user of the client device 108.

The client device 108 enables a user to access and interact with the networked system 116. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An application program interface (API) server 118 and a web server 120 are coupled, and provide programmatic and web interfaces respectively, to the cloud application and domain server 122. The cloud application and domain server 122 is, in turn, shown to be coupled to a cloud database server 124 that facilitates access to information storage repositories (e.g., a cloud database 126). In an example embodiment, the cloud database 126 includes storage devices that store information accessed and generated by the encryption system 106. The cloud database 126 may also store cloud-based data accessed or used by the application 104 executing on the client device 108, or a third-party application 114, executing on a third-party server(s) 112. The cloud database 126 may be comprised of several remote or onsite databases, for example. Other configurations are possible.

The third-party application 114, executing on a third-party server(s) 112, is shown as having programmatic access to the networked system 116 via the programmatic interface provided by the API server 118. For example, the third-party application 114, using information retrieved from the networked system 116, may support one or more features or functions on a website hosted by a third party. As discussed above, computer users in such cloud environments may store secret or confidential data, such as encryption keys or other credentials, in cloud-based databases, such as cloud database 126, or other memory that may be reallocated in a public cloud environment, for example.

Computer hacking attempts, such as "injection" attacks, "stack" or "buffer" overflows, or a "heart-bleed" type of attack, can cause the memory to be "dumped out" and any stored keys or credentials therein can be revealed. Malicious attackers can also induce memory data to change within a short time, and any static data identified therein can be identified as a likely source of keys or other credentials that can be cracked open or attacked. Such automated attacks can include key search capability which can identify and steal keys from dumped memory within a very short time.

Turning now specifically to the applications 104 hosted by the client device 108, the web client 102 may access the various systems (e.g., encryption system 106) via the web interface supported by the web server 120. Similarly, the application 104 (e.g., an "app") accesses the various services and functions provided by the encryption system 106 via the programmatic interface provided by the API server 118. The application 104 may be, for example, an "app" executing on the client device 108, such as an IOS™ or ANDROID™ OS application to enable a user to access and input data on the networked system 116 in an offline manner, and to perform batch-mode communications between the application 104 and the networked system 116.

Further, while the SaaS network architecture 100 shown in FIG. 1 employs a client-server architecture, the present inventive subject matter is not limited to such an architecture, and could equally well find application in a distributed, or peer-to-peer, architecture system, for example. The encryption system 106 could also be implemented as a standalone software program, which does not necessarily have networking capabilities.

Figure 2:
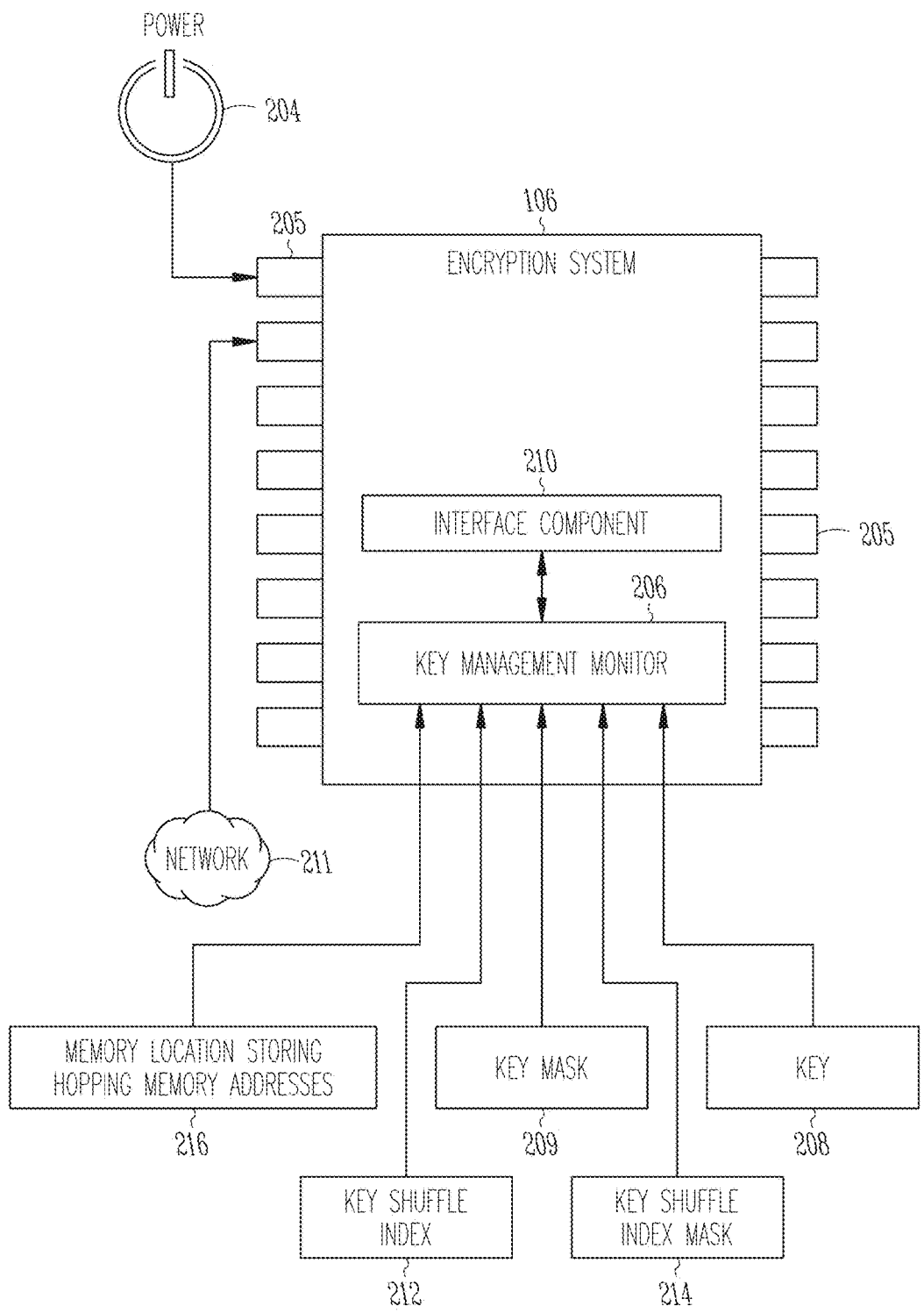
FIG. 2 is a block diagram showing architectural details of an example encryption system working with agents and domains in a cloud environment, according to some example embodiments.

FIG. 2 is a block diagram showing architectural details of an encryption system 106, according to some example embodiments. This is a non-abstract system in the view, includes computer processors and components, and hardwired pins may be seen at 205. A power button is shown at 204. The system is specially-configured and technically improved to implement the methods described more fully below.

More specifically, the encryption system 106 is shown to include an interface component 210 by which the encryption system 106 communicates (e.g., over a network 211) with other systems within the SaaS network architecture 100.

In one example, the interface component 210 is collectively coupled to a key management monitor 206, in association with at least three key elements including a key (or keys) 208, a key mask (or masks) 209, and a key shuffle index (or indexes) 212 each stored at a respective location address within a computer memory, for example within a memory of the client device 108, or in a cloud-based database such as the cloud database 126 remote from the client device 108, but accessible to it. Other key elements utilized in an example encryption system 106 and method can include a shuffle index mask (or masks) 214, and a memory location storing hopping memory addresses 216. These elements interact as described more fully further below.

In one example, the key management monitor 206 may be optionally configured to determine or receive a time duration for performing an external data dump of contents of the applicable computer memory in which the key 208 is stored, such as the cloud database 126. The key management monitor 206 is further configured to control a location of at least one of the three key elements 208, 209, and 212 within the computer memory (e.g. database 126) and change the location address of the at least one key element 208, 209, and 212 within the memory on a periodic or random basis. In one example embodiment, the location address of the at least one key element 208, 209, and 212 is changed within a time period that is less than the time duration for performing the identified or received time for performing an external data dump of the contents of the computer memory. Expressed another way, an external data dump may be "forced" as described above, by a malicious computer attack for example, but this operation will nevertheless still take a certain time to be executed or completed. The memory location of the key 208, key mask 209, or key shuffle index 212 is continuously changed (or hopped) by the key management monitor 206 in time periods which may be random but, in any event shorter than the time it takes to perform the aforesaid data dump.

In some examples, a key mask replaces sensitive key information with fake values in order to protect the actual data. In other words, key masking is a method of confusing an intruder by hiding actual data with a protective layer of real-looking useless data. In some examples, a key shuffle index applies a combination of techniques such as covers, caches, and shuffling to ensure confidentiality of key data and of queries over them, protecting single access instances as well as sequences thereof.

In one example, the key is split between key 208, key mask 209 and key shuffle index 212. A key may be split in other ways, and the respective parts of the key stored in computer memory. The description below of swapping location of parts of the key may still be advantageously used for any parts of a key or other critical information.

In some examples, the time period for changing the location address of the at least one key element 208, 209 and 212 is based on a distance between this location address, and the location address of at least another of the at least three key elements 208-212. For example, the time period may be configured to be less than the time required to dump memory contents including and between the location addresses of two key elements. A technical advantage of this is that a malicious program that dumps memory contents would be unable to dump two or more keys because at least one key element would be changed in location before the dump could complete. Accordingly, a technical advantage is improved security to a computer to protect key elements. In some examples, the distance between the respective location addresses of the key elements 208-212 is changed continuously on a random or pseudo-random basis.

In some examples, the distance between the location addresses for each of the at least three key elements 208-212, and a value for each of the location addresses, is changed continuously on a random basis. The random, or pseudo-random time may be configured to be at or above the time needed to switch location of one key and less than the time to dump memory contents between two key elements. Equally, because there is some performance impact in changing location of keys, a component may also be configured to be above the time to dump memory between keys, yet still determined to be frequent. As stated previously, each distance and value may be changed within a time period that is less that than the time duration for performing the external data dump of contents of the computer memory.

Figure 3:
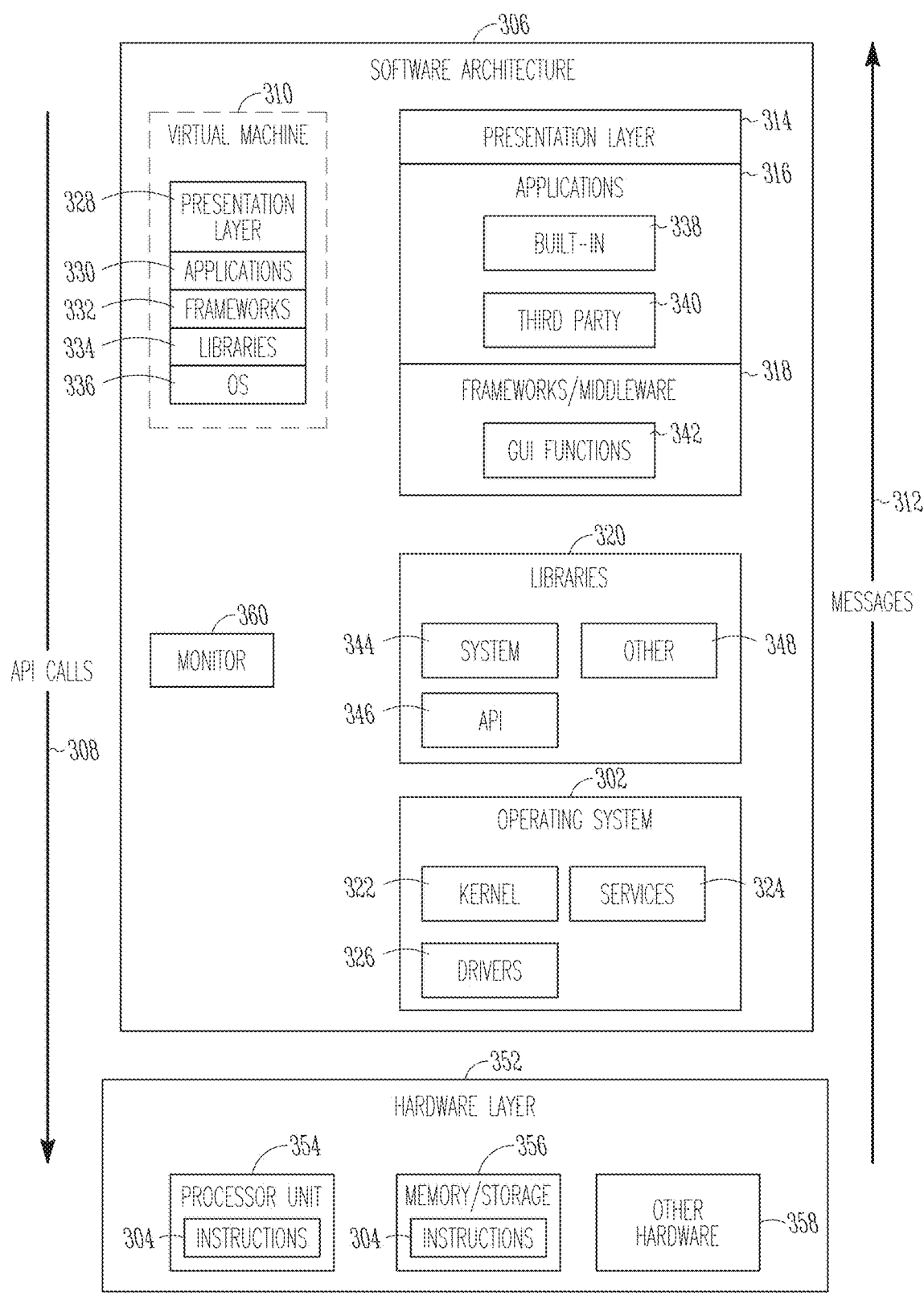
FIG. 3 is a block diagram illustrating a representative software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture 306 and it will be appreciated that many other architectures may be implemented to facilitate the functionality described herein.

Figure 4:
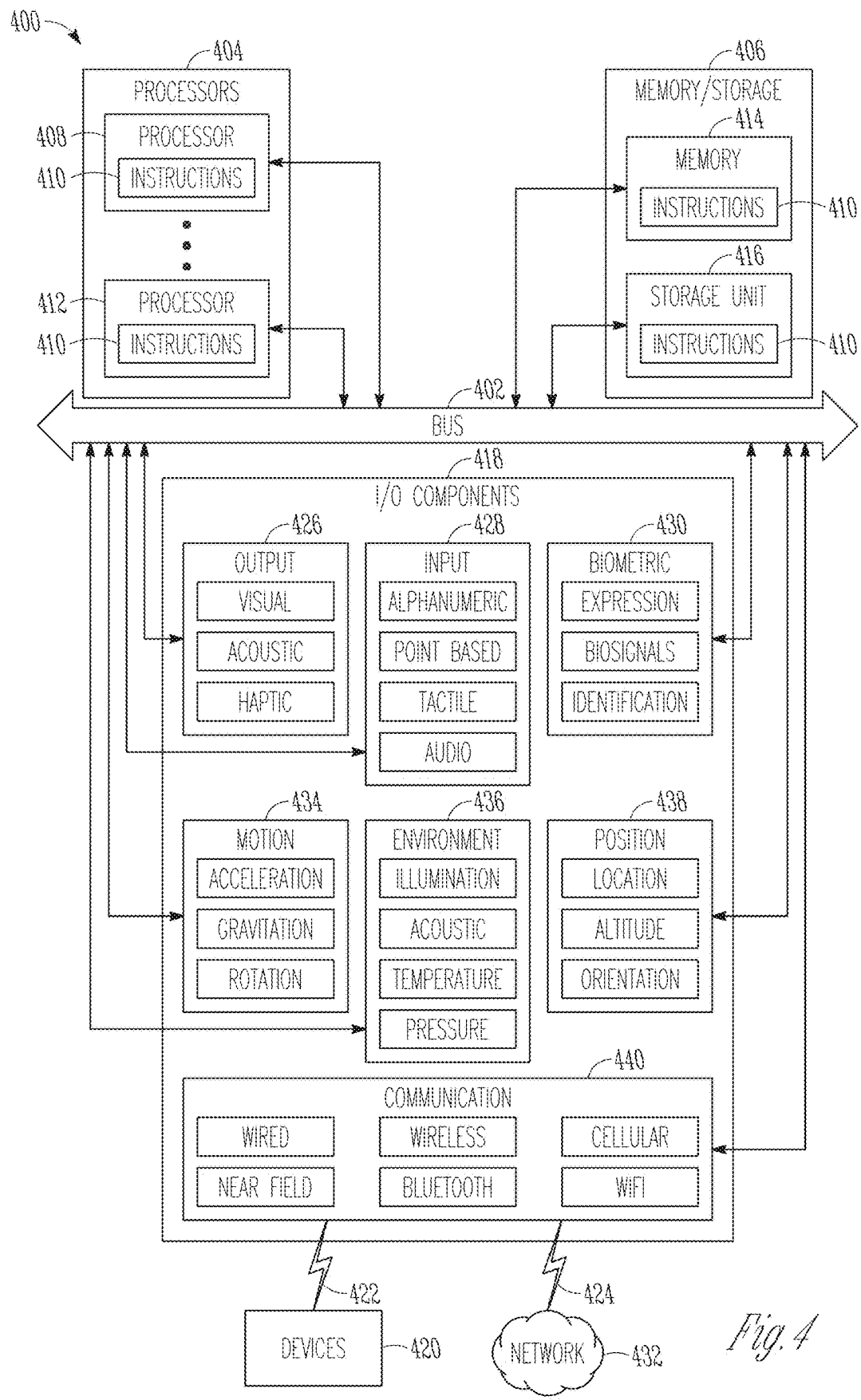
FIG. 4 is a block diagram illustrating components of a machine, according to some example embodiments, able to read instructions from a machine-readable medium (e.g., a machine-readable storage medium) and perform any one or more of the methodologies discussed herein.

The software architecture 306 may execute on hardware such as a machine 400 of FIG. 4 that includes, among other things, processors 404, memory/storage 406, and I/O components 418. A representative hardware layer 352 is illustrated and can represent, for example, the machine 400 of FIG. 4. The representative hardware layer 352 includes a processing unit 354 having associated executable instructions 304. The executable instructions 304 represent the executable instructions 304 of the software architecture 306, including implementation of the methods, components, and so forth described herein. The hardware layer 352 also includes memory and/or storage modules as memory/storage 356, which also have the executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, frameworks/middleware 318, applications 316, and a presentation layer

314. Operationally, the applications 316 and/or other components within the layers may invoke application programming interface (API) API calls 308 through the software stack and receive messages 312 in response to the API calls 308. The layers illustrated are representative in nature, and not all software architectures have all layers. For example, some mobile or special-purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than by interfacing directly with the underlying operating system 302 functionality (e.g., kernel 322, services 324, and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components or modules.

The frameworks/middleware 318 (also sometimes referred to as middleware) provide a higher-level common infrastructure that may be used by the applications 316 and/or other software components/modules. For example, the frameworks/middleware 318 may provide various graphic user interface (GUI) functions 342, high-level resource management, high-level location services, and so forth. The frameworks/middleware 318 may provide a broad spectrum of other APIs that may be utilized by the applications 316 and/or other software components/modules, some of which may be specific to a particular operating system 302 or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. The third-party applications 340 may include any application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 322, services 324, and/or drivers 326), libraries 320, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (operating system 302 in FIG. 3) and typically, although not always, has a virtual machine monitor 360, which manages the operation of the virtual machine 310 as well as the interface with the host operating system (i.e., operating system 302). A software architecture executes within the virtual machine 310, such as an operating system (OS) 336, libraries 334, frameworks 332, applications 330, and/or a presentation layer 328. These layers of software architecture executing within the virtual machine 310 can be the same as corresponding layers previously described or may be different.

FIG. 4 is a block diagram illustrating components of a machine 400, according to some example embodiments, able to read instructions 304 from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 410 (e.g., software, a program, an application 316, an applet, an app, or other executable code) for causing the machine 400 to perform any one or more of the methodologies discussed herein, may be executed. As such, the instructions 410 may be used to implement modules or components described herein. The instructions 410 transform the general, non-programmed machine into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404, memory/storage 406, and I/O components 418, which may be configured to communicate with each other such as via a bus 402. The memory/storage 406 may include a memory 414, such as a main memory, or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine 400 will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion and the grouping is in no way limiting. In various example embodiments, the I/O components 418 may include output components 426 and input components 428. The output components 426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 434, environment components 436, or position components 438 among a wide array of other components. For example, the biometric components 430 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via a coupling 424 and a coupling 422 respectively. For example, the communication components 440 may include a network interface component or another suitable device to interface with the network 432. In further examples, the communication components 440 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a USB).

Moreover, the communication components 440 may detect identifiers or include components operable to detect identifiers. For example, the communication components 440 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geolocation, location via Wi-Fi® signal triangulation, location via detecting an NFC beacon signal that may indicate a particular location, and so forth.

Referring back to the encryption system 106, in some examples, an encryption technique deployed by this system also uses methods based on obfuscation techniques. Thus, in one example, even though a key 208 may be stored in a computer memory or database (e.g. cloud database 126), and even if the memory is "dumped" as described above, an attacker will still face significant difficulty in searching for and finding the key 208 in the dumped contents.

To this end, in one example, a key 208 and key mask 209 "hop" in the sense they are made to continuously change their location in memory. More specifically, in one example, a substantial distance between a masked ephemeral key (termed "a" in the following example algorithms, such as key 208 in FIG. 2), a key mask (similarly "b" in the algorithms, such as key mask 209), masked shuffled indices ("c" in the algorithms, or key shuffle index 212), a shuffle index mask ("d" in the algorithms, such as key shuffle index mask 214) and a memory location storing the changing, or hopping, memory addresses ("e" in the algorithms, such as key element 216 in FIG. 2) is maintained.

These addresses are referred to below as {a,b,c,d,e}. Address {d} may have a static or shifting location in a physical memory, as opposed to a virtual memory, and the encryption system 106 may include a safeguard preventing a system or memory compiler, such as the key management monitor 206, from re-arranging memory allocation. In one example, the key management monitor 206 assigns a defensive code which is stored in a volatile memory. Memory shifting may also be performed.

In one example, the memory locations for {a,b,c} are stored statically, but they hop randomly and hence the memory value changes. In some instances, system entropy is tested before the random data is accepted for use. In some examples, an assumption is made that the entropy of {a,b,c,d,e} and the memory location hopping space for {a,b,c,d,e} is uniform or sufficiently large, for example 64 bits. In some examples, random data is used in generating the addresses {a,b,c,d,e}.

Figure 5:
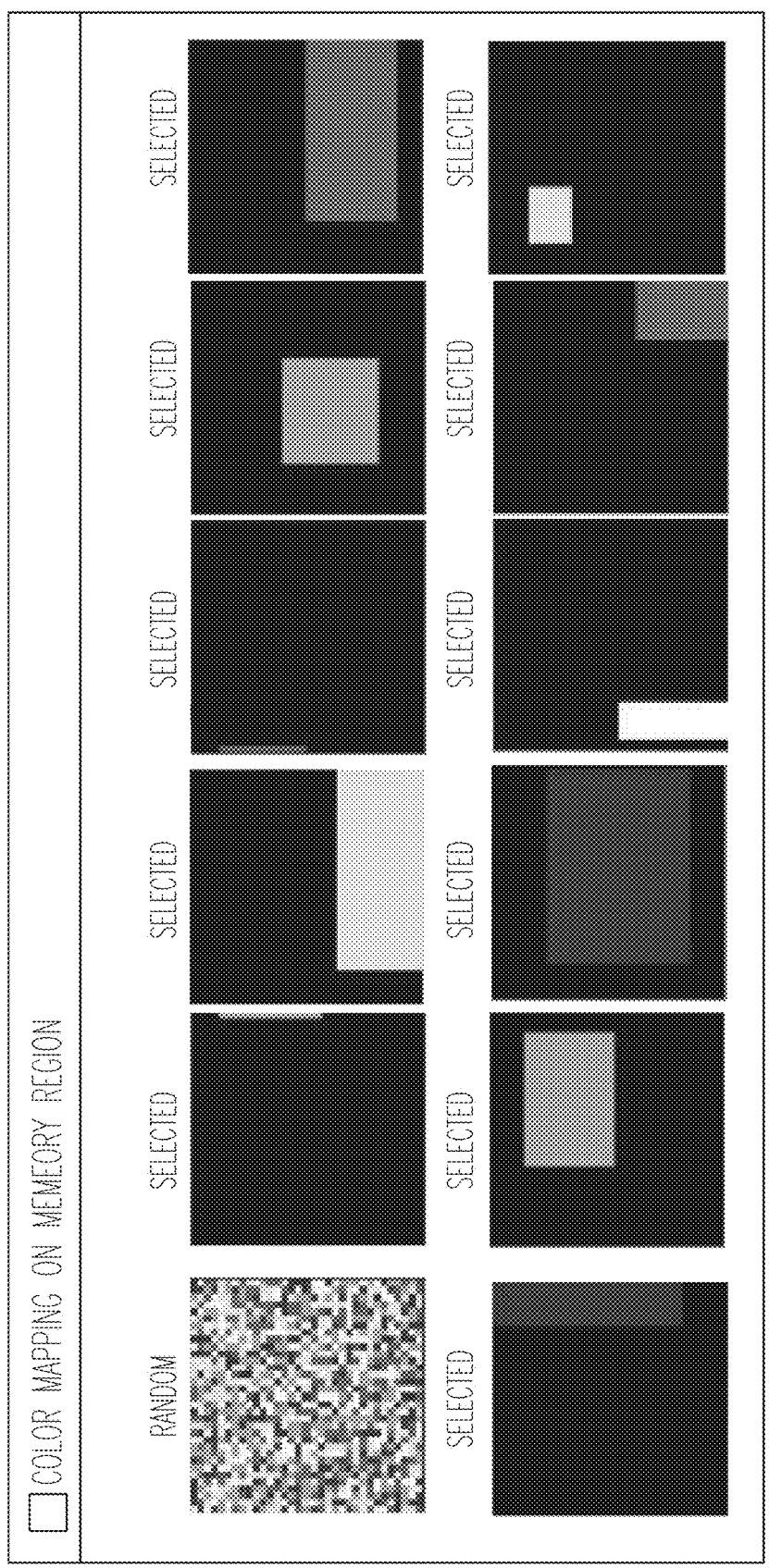
FIG. 5 depicts an example representation of random memory region selection, according to some example embodiments.

An example representation of random memory region selection is depicted in FIG. 5. In the view, a series of twelve panels (six in each row) shows Venn fields in two dimensions. The lightly shaded areas show randomly changing memory region selections for the methods described herein. The first fully-mosaiced panel is representative of a full memory being used for the key masking and hopping operations described herein. The example identified smaller memory regions in the other panels can be reserved if memory conservation is desired.

The example memory region locations depicted in FIG. 5 may exist in one machine memory or database, or across several machine memories (or databases) in a networked or distributed system for example. The methods described and claimed herein may be applied in such a distributed arrangement. Thus, in some examples, a key management monitor may be configured to determine or receive a time duration for performing an external data dump of contents of one or more computer memories in a plurality of computer memories arranged in a distributed system, and may be further configured to control a location of at least one of the key elements within the distributed computer memories and change the location address of the at least one key element within one of the distributed memories on a periodic or random basis, wherein the location address of the at least one key element is changed within a time period that is less than the time duration for performing the external data dump of contents of one of the computer memories. Moreover, the memory locations for the respective key elements may be stored across distributed computer memories or databases.

In some examples, for testing or design purposes, an estimation of a hypothetical attacker's success rate can be derived. In one example, the defense mechanism in an encryption system works on the basis that the probability of guessing the memory locations of the materials to reconstruct the key is overwhelmingly low. An attacker has to try all the possible memory locations in order to find all the key parameters required to reconstruct a key at the given time epoch when the key is still valid. It is also to say that the time epoch set for the key to be valid is constrained within a time less, in some examples much less, than the time required for a legitimate transaction to be completed, for example a data dump. Other transactions are possible.

A further factor is to ensure that the attacker is not able to memory dump each parameter within the given time epoch, hence, a rate limiter of the traffic is set to be lower than the memory distance between each of the key parameters. This means that by the time the attacker attempts the next memory dump to reach for the next key parameter required to reconstruct the key, the key validity is over. Thereby, a technical advantage is that by constraining time and space, the probability of success of an attack attempt can be minimized to a negligible level.

In some examples, given that N is the memory space in bits which corresponds to an entropy space, the probability of an attacker guessing the location of one of the parameters of the key material is in one trial is:

$$\frac{1}{2^N}.$$

As there is more than one parameter required to reconstruct a key, further parameters are considered. Say, A={a,b,c,d,e}, where $\alpha_i$, refers to the bit length of each parameter. Here, there are five parameters, hence i is 1 to 5. If an attacker were to continue further attempts to retrieve a key parameter within a time epoch where the key is still valid, after i number of attempts, the probability of an attacker guessing the location of one of the parameters of the key material in the i-th trial is:

$$\frac{1}{2^{N-\alpha_i}}.$$

The attacker is required to "brute force" guess all locations of the key parameters as it would require all the parts to be gathered for a key reconstruction.

Therefore, in order for the attacker to guess successfully all of the five parameters, the probability is:

$$P_{attack\,Success} := \prod_{j=0}^{j=J} \frac{1}{2\left(N - \sum_{i=0}^{i=j} \alpha_i\right)},$$

given $\alpha_{0=0}$, and here J is 5.

As we can assume that a successful attempt be completed within the time epoch that a key or key parameter is still valid, we can disregard timing constrained by a rate limiter of data outgress in this computation.

To consider a time epoch which can be set for a key to be valid, the epoch time length is constrained within a time length required for a legitimate transaction to be completed. Here, we denote this time length by $\Delta t_{legitimateTraffic}$. Therefore, given $P_{attackSuccess}$ is within $t_{attackSuccess}$, it must satisfy $t_{attackSuccess} << \Delta t_{legitimateTraffic}$. This connotes that there will not be sufficient time for the attacker to complete the attack even if the attacker is able to maximize the probability of success in the attack, $P_{attackSuccess}$. The time length during which the key is valid is in one example equivalent to a time much lower than the legitimate transaction time, hence, we can define a time length where the attack success is negligible, i.e. $\varepsilon = t_\sigma$ of $\Delta t_{legitimateTraffic}$, where $t\sigma << \Delta t_{legitimateTraffic}$.

Even if there is replication in different machines, say K duplications, due to unique masks, obtaining the replicates does not help as they are indistinguishable from an One-time Pad (OTP).

In other aspects, an advanced persistent attack (APT) could still perform a core memory dump and hunt for a key 208 in a compounded attack, for example using infiltration malware to conduct surveillance and force an internal key dump, followed by an exfiltration of the core dump. The memory containing the memory locations {a,b,c,d,e} may still be static. A code dump, though minimized, can still pose a security risk. But here, a defensible time epoch for performing an internal memory dump and external memory dump may be different. More specifically, a time for malware, $t_{malware}$, to perform an internal dump and conduct illegitimate traffic for exfiltration may be identified. As long as $t_{malware}$ is indistinguishable or indifferentiable from a time needed to process legitimate traffic, $\Delta t_{legitimateTraffic}$, even if hidden within associated noise delta, i.e $t_{malware} \xrightarrow{lim} t_o$ to the methods described may be applied.

Thus, in one example, there is provided an encryption (or computer security) system comprising a key management monitor, and at least three key elements including a key, a key mask, and a key shuffle index each stored at a respective location address within a computer memory. The key management monitor may be configured to determine or receive a time duration for performing an external data dump of contents of the computer memory, and may be further configured to control a location of at least one of the three key elements within the computer memory and change the location address of the at least one key element within the memory on a periodic or random basis, wherein the location address of the at least one key element is changed within a time period that is less than the time duration for performing the external data dump of contents of the computer memory.

In some examples, the time period for changing the location address of the at least one key element may be based on a distance between this location address, and the location address of at least one other of the at least three key elements, and the distance between the respective location addresses may be changed continuously on a random basis.

In some examples, the distance between the location addresses for each of the at least three key elements, and a value for each of the location addresses, is changed continuously on a random basis, and each distance and value may be changed within a time period that is less than the time duration for performing the external data dump of contents of the computer memory.

In some examples, the key monitor is further configured to test an entropy of a system which includes the computer memory before a paradigm for controlling the location of the at least one of the three key elements within the computer memory is accepted for use. In some examples, the at least three key elements further include one or both of a key shuffle index mask a memory location storing the changing memory location addresses.

In some examples, a computer security system comprises a key management monitor, and two key elements comprising a first key element and a second key element, the first key element stored at a first location address within a computer memory and the second key element stored at a second location address. The key management monitor may be configured to determine or receive a time duration for performing a data dump of contents of the computer memory. The key management monitor may be further configured to control a location of the first key element within the computer memory, wherein the location address of the first key element is changed within a time period that is less than the time duration for performing the data dump of contents of the computer memory.

In some examples, the time period is less than the time duration for performing the data dump of contents of the computer memory between the first location address and the second location address. The time period for changing the location address of the first key element may be based on a distance between the first location address and the second location address, and the distance between the first location address and the second location address may be changed continuously on a random basis.

In some examples, the distance between the first location address and the second location address is changed continuously on a random basis, and each distance and value is changed within a time period that is less than the time duration for performing the data dump of contents of the computer memory.

In some examples, the key monitor is further configured to test an entropy of a system which includes the computer memory before a paradigm for controlling the location of the first key element within the computer memory is accepted for use.

In some examples, the two key elements include a key shuffle index mask, and may include a memory location storing the changing memory addresses.

Figure 6:
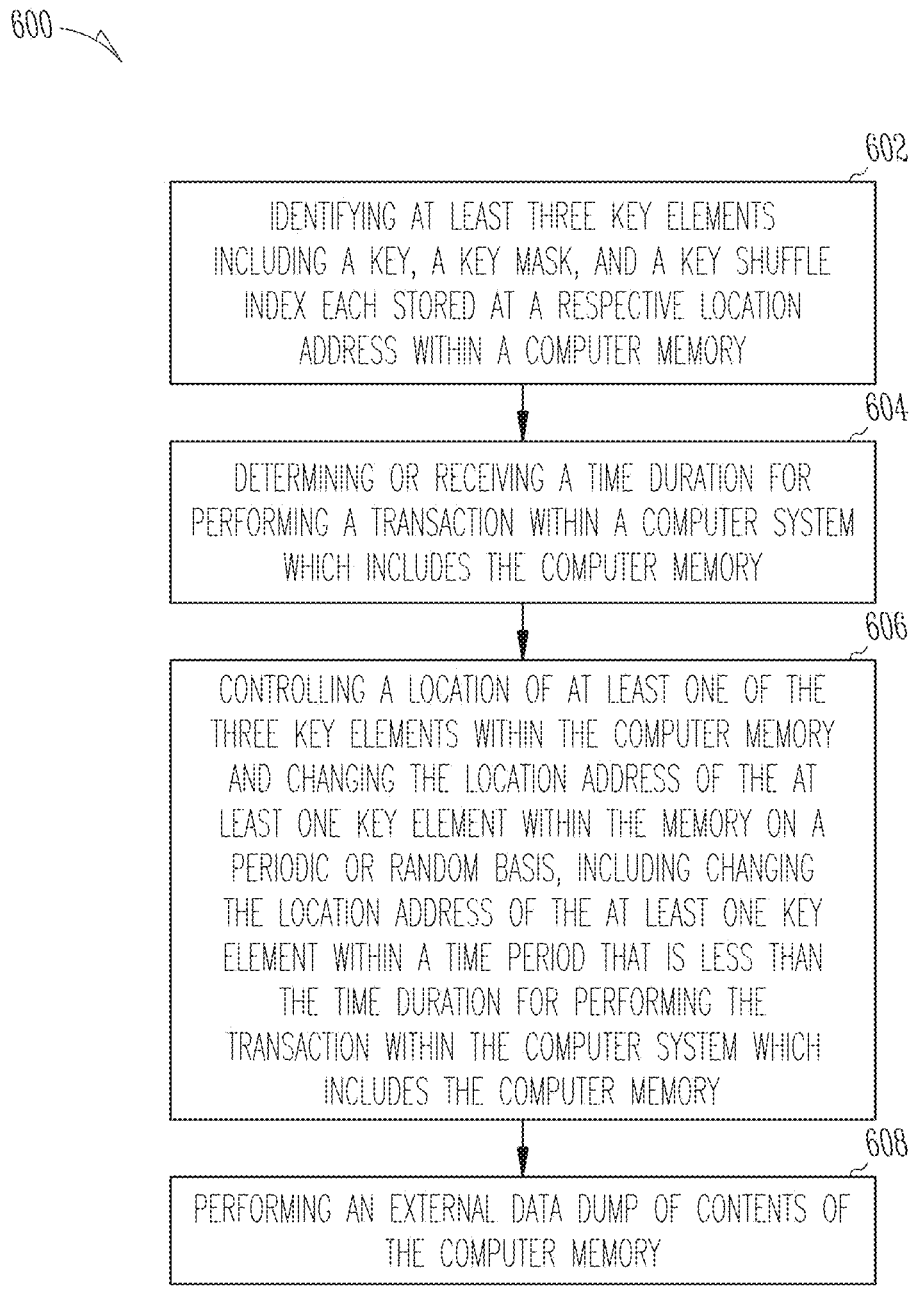
FIG. 6 is a flow chart depicting some operations in an encryption method, in accordance with an example embodiment.

The present disclosure also includes example methods. In one example, with reference to FIG. 6, an encryption method 600 includes, at 602, identifying at least three key elements including a key, a key mask, and a key shuffle index each stored at a respective location address within a computer memory; at 604, determining or receiving a time duration for performing a transaction within a computer system which includes the computer memory; at 606, controlling a location of at least one of the three key elements within the computer memory and changing the location address of the at least one key element within the memory on a periodic or random basis, including changing the location address of the at least one key element within a time period that is less than the time duration for performing the transaction within the computer system which includes the computer memory. In one example, the transaction within the computer system which includes the computer memory includes, at 608, performing an external data dump of contents of the computer memory.

The encryption method 600 may further comprise identifying the time period for changing the location address of the at least one key element based on a distance between this location address, and the location address of at least one other of the at least three key elements; and changing the distance between the respective location addresses continuously on a random basis.

In some examples, the encryption method 600 further comprises changing the distance between the location addresses for each of the at least three key elements, and a value for each of the location addresses, continuously on a random basis; and changing each distance and value within a time period that is less than the time duration for performing the external data dump of contents of the computer memory.

In some examples, the encryption method 600 further comprises configuring a key monitor to test an entropy of the computer system which includes the computer memory before a paradigm for controlling the location of the at least one of the three key elements within the computer memory is accepted for use. Further in some examples, the at least three key elements further include one or both of a key shuffle index mask and a memory location storing the changing memory location addresses.

In some examples, a computer security method comprises identifying two key elements, the two key elements including a first key element and a second key element, the first key element stored at a first location address and the second key element stored at a second location address within a computer memory; determining or receiving a time duration for performing a transaction within a computer system which includes the computer memory; controlling a location of at least one of the two key elements within the computer memory and changing the location address of the at least one key element within the memory on a periodic or random basis, including changing the location address of the at least one key element within a time period that is less than the time duration for performing the transaction within the computer system which includes the computer memory. In some examples, the transaction includes performing a data dump of contents of the computer memory The computer security method may further comprise identifying the time period for changing the location address of the at least one key element based on a distance between the first location address and the second location address, and changing the distance between the respective location addresses continuously on a random basis.

In some examples, the computer security method further comprises changing the distance between the location addresses for each of the two key elements, and a value for each of the location addresses continuously on a random basis; and changing each distance and value within a time period that is less than the time duration for performing the data dump of contents of the computer memory.

In some examples, the computer security method further comprises configuring a key monitor to test an entropy of the computer system which includes the computer memory before a paradigm for controlling the location of the at least one of the two key elements within the computer memory is accepted for use. In some examples, the two key elements further include one or both of a key shuffle index mask and a memory location storing the changing memory location addresses.

In some examples, a non-transitory machine-readable medium includes instructions 410 that, when read by a machine 400, cause the machine 400 to perform operations comprising at least the non-limiting example operations summarized above.

Although the subject matter has been described with reference to some specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A computer security system comprising:
   one or more processors; and
   one or more computer storage media storing instructions that, when used by the one or more processors, cause the one or more processors to perform operations comprising:
      determining a first location address within a computer memory for a first key element and a second location address within the computer memory for a second key element, the first key element and the second key element being usable to form a key;
      determining a periodic time interval based on a distance between the first location address and the second location address;
      storing the first key element at the first location address at a first point in time; and
      relocating, at a second point in time that is the periodic time interval after the first point in time, the first key element to a third location address within the computer memory.

2. The computer security system of claim 1, wherein the operations further comprise:
   reserving one or more memory areas within the computer memory as static during relocation of the first key element.

3. The computer security system of claim 2, wherein the operations further comprise:
   determining a random value for the third location address, wherein the random value is outside of a plurality of location addresses within the reserved one or more memory areas.

4. The computer security system of claim 1, wherein the periodic time interval is a random time duration that is less than a time duration for performing a transaction involving the distance between the first location address and the second location address.

5. The computer security system of claim 4, wherein the transaction includes performing a data dump of contents of the computer memory.

6. The computer security system of claim 5, wherein the first key element comprises a key mask and the second key element comprises a key shuffle index.

7. The computer security system of claim 1, wherein the operations further comprise:
   assigning a random value to the distance between the first location address and the second location address.

8. One or more non-transitory machine-readable media storing computer-useable instructions that, when used by one or more computing devices, cause the one or more computing devices to perform operations, the operations comprising:

determining a first location address within a computer memory for a first key element and a second location address within the computer memory for a second key element, the first key element and the second key element being usable to form a key;

determining a periodic time interval based on a distance between the first location address and the second location address;

storing the first key element at the first location address at a first point in time; and relocating, at a second point in time that is the periodic time interval after the first point in time, the first key element to a third location address within the computer memory.

9. The one or more non-transitory machine-readable media of claim 8, wherein the operations further comprise:

reserving one or more memory areas within the computer memory as static during relocation of the first key element.

10. The one or more non-transitory machine-readable media of claim 9, wherein the operations further comprise:

determining a random value for the third location address, wherein the random value is outside of a plurality of location addresses within the reserved one or more memory areas.

11. The one or more non-transitory machine-readable media of claim 8, wherein the periodic time interval is a random time duration that is less than a time duration for performing a transaction involving the distance between the first location address and the second location address.

12. The one or more non-transitory machine-readable media of claim 11, wherein the transaction includes performing a data dump of contents of the computer memory.

13. The one or more non-transitory machine-readable media of claim 8, wherein the operations further comprise:

assigning a random value to the distance between the first location address and the second location address.

14. The one or more non-transitory machine-readable media of claim 8, wherein the first key element comprises a key mask and the second key element comprises a key mask shuffle index.

15. A computer-implemented method comprising:

determining a first location address within a computer memory for a first key element and a second location address within the computer memory for a second key element, the first key element and the second key element being usable to form a key;

determining a periodic time interval based a distance between the first location address and the second location address;

storing the first key element at the first location address at a first point in time; and relocating, at a second point in time that is the periodic time interval after the first point in time, the first key element to a third location address within the computer memory.

16. The computer-implemented method of claim 15, wherein the method further comprises:

reserving one or more memory areas within the computer memory as static during relocation of the first key element.

17. The computer-implemented method of claim 16, wherein the method further comprises:

determining a random value for the third location address, wherein the random value is outside of a plurality of location addresses within the reserved one or more memory areas.

18. The computer-implemented method of claim 15, wherein the periodic time interval is a random time duration that is less than a time duration for performing a transaction involving the distance between the first location address and the second location address.

19. The computer-implemented method of claim 18, wherein the transaction includes performing a data dump of contents of the computer memory.

20. The computer-implemented method of claim 15, wherein the method further comprises:

assigning a random value to the distance between the first location address and the second location address.

* * * * *